(12) United States Patent
Song et al.

(10) Patent No.: US 9,560,217 B2
(45) Date of Patent: Jan. 31, 2017

(54) ADAPTERS, TERMINAL DEVICES, USB CONNECTION DEVICES AND CHARGING STATIONS

(75) Inventors: Jian cheng Song, Beijing (CN); Ting ting Wang, Beijing (CN); Guang ting Jiang, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 276 days.

(21) Appl. No.: 13/824,218

(22) PCT Filed: Sep. 21, 2011

(86) PCT No.: PCT/CN2011/079950
§ 371 (c)(1),
(2), (4) Date: Mar. 15, 2013

(87) PCT Pub. No.: WO2012/041176
PCT Pub. Date: Apr. 5, 2012

(65) Prior Publication Data
US 2013/0190059 A1    Jul. 25, 2013

(30) Foreign Application Priority Data
Sep. 29, 2010   (CN) .......................... 2010 1 0500346

(51) Int. Cl.
*H04B 1/38* (2015.01)
*H04M 19/08* (2006.01)
(Continued)

(52) U.S. Cl.
CPC .............. *H04M 19/08* (2013.01); *G06F 1/263* (2013.01); *H02J 7/027* (2013.01); *H01R 13/6675* (2013.01);
(Continued)

(58) Field of Classification Search
CPC ..... G06F 1/266; H02J 7/025; H02J 2007/0062
(Continued)

(56) References Cited

U.S. PATENT DOCUMENTS

2004/0129522 A1*  7/2004  Skowronski ............. 191/12.2 R
2007/0005840 A1*  1/2007  Cheng et al. .................. 710/62
(Continued)

FOREIGN PATENT DOCUMENTS

| CN | 1881738 A | 12/2006 |
|---|---|---|
| CN | 101232196 A | 7/2008 |
| CN | 201766243 U | 3/2011 |

OTHER PUBLICATIONS

International Search Report of the SIPO in international application No. PCT/CN2011/079950 dated Dec. 15, 2011.

*Primary Examiner* — Tu X Nguyen
(74) *Attorney, Agent, or Firm* — Kinney & Lange, P.A.

(57) ABSTRACT

Adapters, terminal devices, USB connection devices and charging stations are disclosed. The adapter includes a first port configured to connect to an alternate current (AC) source, a conversion module configured to convert an AC power from the AC source into a direct current (DC) power, a second port configured to connect to a first electronic device and provide power thereto, an uplink interface configured to connect to the first electronic device, a downlink interface coupled with the conversion module to obtain an external power supply therefrom and configured to connect to a second electronic device, and a signal control module arranged between the uplink and downlink interfaces, and configured to control a status of a signal in the downlink interface based on a status of a power supply of the uplink interface. The second electronic device enters one of the operating and charging modes based on the status of the signal in the downlink interface, when the second electronic device is coupled with the downlink interface. With the (Continued)

present invention, charging of an electronic device which can be charged only upon recognizing the signal line status of the downlink interface can be enabled even if a computer is powered off or in a sleep state.

2 Claims, 4 Drawing Sheets

(51) Int. Cl.
*H02J 7/02* (2016.01)
*G06F 1/26* (2006.01)
*H01R 13/66* (2006.01)
*H01R 31/06* (2006.01)
*H02J 7/00* (2006.01)

(52) U.S. Cl.
CPC ...... *H01R 31/065* (2013.01); *H02J 2007/0001* (2013.01); *H02J 2007/006* (2013.01); *H02J 2007/0062* (2013.01)

(58) Field of Classification Search
USPC .............................................. 455/556.1, 557
See application file for complete search history.

(56) References Cited

U.S. PATENT DOCUMENTS

| | | | |
|---|---|---|---|
| 2008/0012423 A1* | 1/2008 | Mimran | H01R 25/003 307/11 |
| 2008/0258688 A1* | 10/2008 | Hussain | H02J 7/06 320/145 |
| 2010/0161869 A1 | 6/2010 | Uchida | |

* cited by examiner

ADAPTERS, TERMINAL DEVICES, USB CONNECTION DEVICES AND CHARGING STATIONS

TECHNICAL FIELD

Embodiments of the present invention relate to charging technology, and more particularly, to adapters, terminal devices, USB connection devices and charging stations.

BACKGROUND

With development and popularization of electronic devices, various charge methods have been applied, including conventional charge methods using specific adapters and newly proposed charge methods using interfaces such as USB. For mobile electronic devices, they are typically charged by connection to PCs or notebook computers. For example, a mobile phone can be charged by directly coupling it to a PC or notebook computer. For some smart phones, however, in order to charge them, computers must be powered on and cannot be in a sleep state. This is because such smart phone needs to determine whether to initiate a charging process based on status of two differential signal lines of a downlink USB interface of the computer. A voltage exists on the two differential signal lines only when the computer is powered on and not in a sleep state. The smart phone will start a charging operation only if it detects a connection mode. When the computer is powered off or in a sleep state, no status signal is outputted from the two differential signal lines of the downlink USB interface. As a result, the smart phone will not detect a connection mode, and thus will not start a charging operation.

SUMMARY

Embodiments of the present invention provide adapters, terminal devices, USB connection devices and charging stations. With the embodiments of the present invention, smart mobile terminals, which can be charged only after recognition of signal line status of a downlink interface in conventional methods, can be charged when a computer is in a power-off or sleep state.

An embodiment of the present invention provides an adapter including a first port configured to connect to an alternate current (AC) source, a conversion module configured to convert an AC power from the AC source into a direct current (DC) power, a second port configured to connect to a first electronic device and provide power to the first electronic device, an uplink interface configured to connect to the first electronic device, a downlink interface coupled with the conversion module to obtain an external power supply from the conversion module to and configured to connect to a second electronic device different from the first electronic device and having an operating mode and a charging mode, and a signal control module coupled with the conversion module to obtain an external power supply from the conversion module, arranged between the uplink interface and the downlink interface, and configured to control a status of a signal in the downlink interface based on a status of a power supply of the uplink interface. The second electronic device enters one of the operating and charging modes based on the status of the signal in the downlink interface, when the second electronic device is coupled with the downlink interface.

In an embodiment, there are multiple downlink interfaces. The adapter further includes an interface control module arranged between the uplink interface and the downlink interface and configured to multiplex one downlink interface signal into a plurality of downlink interface signals. The signal control module is arranged between the interface control module and the downlink interface.

In an embodiment, the signal control module is further configured to set the status of the signal line in the downlink interface to a connection on status when there is no supply voltage of the uplink interface, such that the second electronic device enters the charging mode based on the connection on status. The downlink interface uses a voltage from the external power supply to charge the second electronic device.

In an embodiment, the downlink interface includes a USB interface.

A further embodiment of the present invention provides a terminal device including a power supply module, a downlink interface and a signal control module. The power supply module is configured to provide an external power supply to the downlink interface and the signal control module. The downlink interface is configured to connect to an electronic device to be charged. The electronic device to be charged has an operating mode and a charging mode. The signal control module is arranged in a path for providing power supply from a chipset of the terminal device to the downlink interface, and configured to control a status of a signal line in the downlink interface based on a power supply status on the path. The electronic device to be charged enters one of the operating and charging modes based on the status of the signal line in the downlink interface, when the electronic device is connected to the downlink interface.

In an embodiment, there are multiple downlink interfaces. The terminal device further includes an interface control module arranged in the path and configured to multiplex one downlink interface signal into a plurality of downlink interface signals. The signal control module is arranged between the interface control module and the downlink interface.

In an embodiment, the signal control module is further configured to set the status of the signal line in the downlink interface to a connection on status when there is no supply voltage on the path, such that the electronic device to be charged enters the charging mode based on the connection on status. The downlink interface uses a voltage from the external power supply to charge the electronic device.

In an embodiment, the downlink interface includes a USB interface.

A still further embodiment of the present invention provides a USB connection device including a power supply module, an uplink USB interface, a downlink USB interface and a signal control module. The power supply module is configured to provide an external power supply to the downlink USB interface and the signal control module. The uplink USB interface is configured to connect to a first electronic device. The downlink USB interface is configured to connect to a second electronic device different from the first electronic device and having an operating mode and a charging mode. The signal control module is arranged between the uplink USB interface and the downlink USB interface, and configured to control a status of a signal in the downlink USB interface based on a status of a power supply of the uplink USB interface. The second electronic device enters one of the operating and charging modes based on the status of the signal in the downlink USB interface, when the second electronic device is coupled with the downlink USB interface.

In an embodiment, the USB connection device further includes a USB interface control module arranged between the uplink USB interface and the downlink USB interface and configured to multiplex one downlink interface signal into a plurality of downlink interface signals. The signal control module is arranged between the USB interface control module and the downlink USB interface.

In an embodiment, the signal control module is further configured to set the status of the signal line in the downlink USB interface to a connection on status when there is no supply voltage of the uplink USB interface, such that the second electronic device enters the charging mode based on the connection on status. The downlink USB interface uses a voltage from the external power supply to charge the second electronic device.

A yet further embodiment of the present invention provides a charging station including a power supply port configured to connected an alternate current (AC) source, a conversion module configured to convert an AC power from the AC source into a direct current (DC) power, and a downlink interface coupled with the conversion module and configured to connect to an electronic device to be charged. A status of a signal line in the downlink interface includes a connection on status. The electronic device to be charged enters a charging mode based on the connection on status, when the electronic device is connected to the downlink interface. The downlink interface uses a supply voltage obtained from the conversion module to charge the electronic device.

According to the embodiments of the present invention, the signal control module controls signal line status in the downlink interface such that a status signal can be outputted to the downlink interface even when a terminal device (e.g., computer) coupled with the uplink interface is in a power-off or sleep state, and the electronic device coupled to the downlink interface can recognize the status signal and enter the charging mode, thereby enabling the electronic device to be charged.

BRIEF DESCRIPTION OF THE DRAWINGS

Figures will be explained to further illustrate embodiments of the present application or conventional solutions. The figures show only some embodiments of the present application. Other figures are also apparent to those skilled in the art.

DETAILED DESCRIPTION OF THE EMBODIMENTS

In the following, embodiments of the present invention will be further explained with reference to the figures. The described embodiments are only some examples of the present invention. Any other embodiment that those skilled in the art can envision based on the described embodiments falls into the scope of the present invention.

Figure 1:
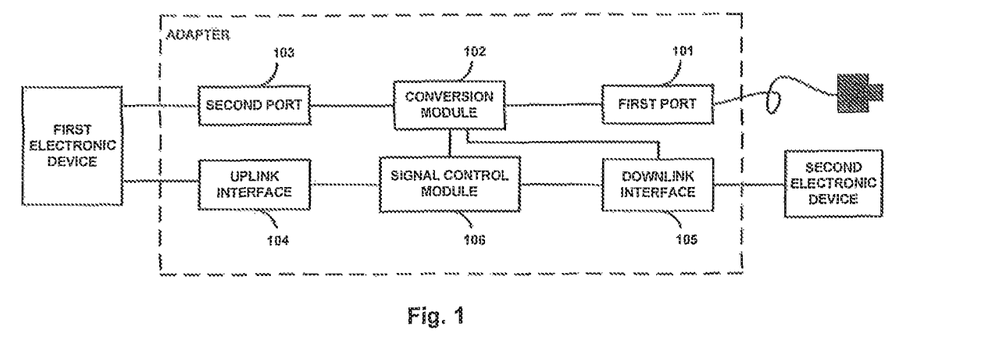
FIG. 1 is a schematic block diagram of an adapter according to an embodiment of the present invention.

FIG. 1 shows an adapter according to an embodiment of the present invention. The adapter includes a first port 101, a conversion module 102, a second port 103, an uplink interface 104, a downlink interface 105 and a signal control module 106.

The first port 101 is configured for connection to an AC source. In an embodiment, the first port 101 may be a port installed in a power outlet.

The conversion module 102 is configured to convert AC power from the AC source into DC power. The power outlet often provides AC power, while electronic device require DC power. Therefore, the conversion module 102 is provided in the adapter to convert AC power to DC power for providing to electronic device.

The second port 103 is configured for connection to a first electronic device and providing power to the first electronic device. The first electronic device may be a computer such as a notebook computer.

The uplink interface 104 is configured for connection to the first electronic device. The uplink interface 104 may be USB interface, a FIREWIRE (1394) interface or any suitable interface. Such interface may be used to enable data transmission with an external electronic device or to charge the external electronic device (according to conventional methods, the external device can be charged only when the first electronic device is powered-on and not in a sleep state).

The downlink interface 105 is coupled with the conversion module to obtain an external supply voltage from the conversion module. The downlink interface 105 is configured for connection to a second electronic device that is different from the first electronic device and has an operating mode and a charging mode. The uplink and downlink interfaces 105 and 104 correspond to each other, and thus may be of the same type. That is, if the uplink interface 104 is a USB interface, the downlink interface 105 will be a USB interface.

The second electronic device refers to an electronic device to be charged, such as a mobile communication device. An example will be given for a better understanding. For example, there is a typical situation where the first electronic device is a notebook computer, and the second electronic device is a mobile phone. According to an embodiment of the present invention, the adapter of the notebook computer may have an uplink USB interface for connection to the notebook computer and a downlink USB interface for connection to the mobile phone. When the notebook computer is powered on and not in a sleep state, the mobile phone is in an operating mode and thus can perform data transmission via the USB interface. Meanwhile, if a charging operation is required, the mobile phone will be charged based on a signal line status of the downlink USB interface.

In other words, when the first electronic device is powered on and not in a sleep state, the downlink interface 105 of the adapter can obtain a power supply (typically, 5V) from a chipset (e.g., a south bridge chip) of the first electronic device. On the other hand, the chipset cannot supply power to the downlink interface 105 when the first electronic device is in a power-off or sleep state.

According to an embodiment of the present invention, the downlink interface 105 is also coupled with the conversion module 102. The conversion module 102 may convert the AC power from the first port 101 into the DC power and output the DC power, once the first port 101 is installed on the power outlet. Therefore, the downlink interface 105 can obtain a supply voltage from the conversion module even though the first electronic device is powered off or in a sleep state. Here, the supply voltage obtained from the conversion module is called external power supply, in order to distinguishing from the power supply from the chipset of the first electronic device as in the convention methods. Such external power supply is constantly available. When the first electronic device is powered on and not in a sleep state (i.e., the second electronic device is in the operating mode), the downlink port 105 has two supply voltages, one from the power supply of the chipset in the first electronic device, and the other from the external power supply. When the first electronic device is powered off or in a sleep state, the downlink port 105 has only the supply voltage from the external power supply. The downlink port 105 may use the supply voltage obtained from the chipset to charge the second electronic device, when the first electronic device is powered on and not in a sleep state. When the first electronic device is powered off or in a sleep state, the downlink port 105 still has the supply voltage from the external power supply. In the conventional methods, however, no status signal will be outputted for the signal line of the downlink interface, and thus it is impossible to charge the second electronic device.

The signal control module 106 is coupled with the conversion module to obtain an external power supply from the conversion module. The signal control module 106 is arranged between the uplink interface and the downlink interface, and configured to control a status of a signal in the downlink interface based on a status of a power supply of the uplink interface. The second electronic device enters one of the operating and charging modes based on the status of the signal in the downlink interface, when the second electronic device is coupled with the downlink interface In this embodiment, the signal control module 106 is provided in the adapter to enable charging of the second electronic device when the first electronic device is powered off or in a sleep state. The signal control module 106 may obtain an external power supply from the conversion module 102, such that the signal control module 106 can obtain a voltage required by its operation no matter which state the first electronic device enters. In an embodiment, the signal control module 106 may detect the power supply status of the uplink interface 104, and control the signal line status of the downlink interface 105 based on the detected power supply status.

For example, when the first electronic device is powered on and not in a sleep state, the chipset of the first electronic device provides a supply voltage to the uplink interface 104 of the adapter, and then the uplink interface 105 provides the supply voltage to the downlink interface 105. If the first electronic device is powered off or in a sleep state, there will be no supply voltage on the uplink interface 104. Accordingly, the signal line status in the downlink interface 105 may be controlled based on the supply voltage status on the uplink interface 104. That is, if the supply voltage is detected on the uplink interface 104, it is determined that the first electronic device is powered on and not in a sleep state. In this case, the status signal outputted from the signal line of the downlink interface 105 will be a normal signal indicative of the operating mode. The second electronic device may accordingly enter the charging mode and thus be charged with the voltage from the chipset of the first electronic device.

If the signal control module 106 detects that no supply voltage exists on the uplink interface 104, it will determine that the first electronic device is powered off or in a sleep state. To indicate this status, another signal will be outputted from the signal line of the downlink interface. In an embodiment, the signal line status in the downlink interface may be set to a connection on status, and the second electronic device may enters the charging mode in response to the connection on status. Accordingly, the downlink interface 105 may use the external power supply to charge the second electronic device. That is, when the first electronic device is powered off or in a sleep state, the downlink interface 105 still has a supply voltage thereon, and thus outputs a signal indicative of the signal line status. In response to the signal, the second electronic device will enter the charging mode. In this case, the second electronic device can be charged via the downlink interface, though no data transmission can be performed with the first electronic device. At this time, only the external power supply from the conversion module of the adapter exists on the downlink interface 105. Accordingly, the downlink interface 105 uses this external power supply to charge the second electronic device.

Figure 2:
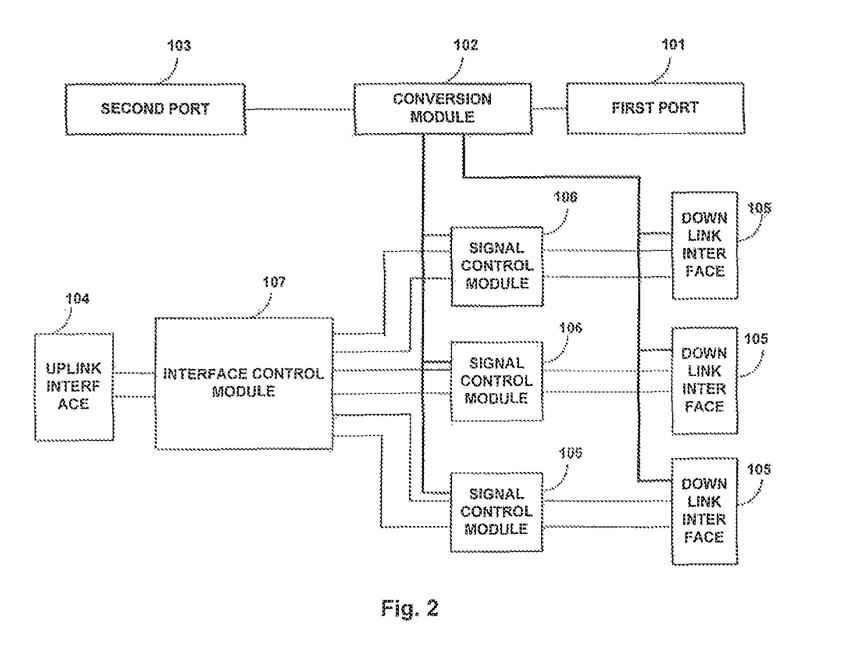
FIG. 2 is a schematic block diagram of another adapter according to an embodiment of the present invention.

In another embodiment, there may be a plurality of downlink interfaces 105 in order to simultaneously connect to a plurality of second electronic devices. FIG. 2 is a schematic block diagram of another adapter according to the embodiment. As shown in FIG. 2, an interface control module 207 is further provided in the adapter. The interface control module 207 is arranged between the downlink interface 205 and the uplink interface 204, and configured to multiplex one downlink interface signal into a plurality of downlink interface signals, such that a plurality of second electronic devices can be connected to the adapter, or indirectly to the first electronic device, via multiple downlink interfaces 205. In this case, there may be a plurality of signal control modules 206 each arranged between the interface control module 206 and a respective one of the downlink interfaces 205.

The signal control module may be used to switch the signal line status of the downlink interface, that is, switch the signal line in the downlink interface to different statuses with respect to different states of the first electronic device.

Figure 3:
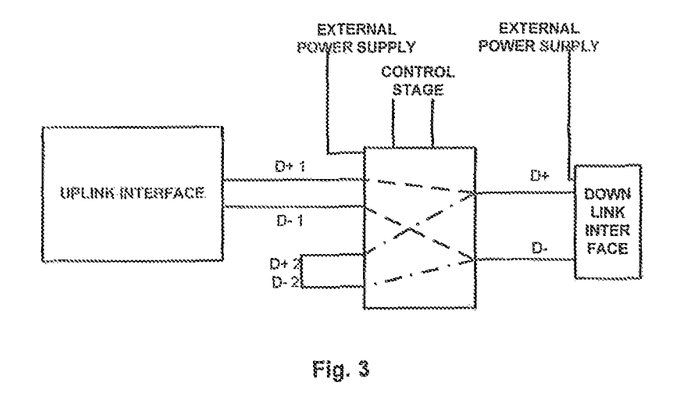
FIG. 3 is a schematic diagram showing operation of a signal control module according to an embodiment of the present invention.

In an embodiment, if there is no supply voltage on the uplink interface, and the signal line status of the downlink interface is set to a connection on status, the signal control module may be implemented as shown in FIG. 3. FIG. 3 is a schematic diagram showing operation of a signal control module according to an embodiment of the present invention.

As shown in FIG. 3, the signal line status of the downlink interface may be switched between D+1, D−1 and D+2, D−2 in two control stages. When the first electronic device is powered on and not in a sleep state, the status signal D+1, D−1 may be outputted to the signal lines D+, D− in the downlink interface. If it is detected that the first electronic device is powered off or in a sleep state, the status signal D+2, D−2 may be outputted to the signal lines D+, D− in the downlink interface. This status signal indicates that the two signal lines in the downlink interface is in a connection on (short-circuit) status, and has been disconnected from the interface control module. In this way, the second electronic device may obtain a status signal of the signal lines in the downlink interface and enter the charging mode in response to the signal. Here, the connection on status of D+2 and D−2 may be pre-configured, and it is the signal control module that decides when the signal may be outputted to the signal lines in the downlink interface.

According to the embodiment of the present invention, the adapter can be connected to the second electronic device via the downlink interface, and there is a status signal output on the signal lines of the downlink interface even when the first electronic device is powered off or in a sleep state. That is, with the adapter of the present embodiment, the second electronic device can be charged, even if the first electronic device is powered off or in a sleep state, and the second electronic device can be charged only when there is a status signal output on the signal lines of the downlink interface.

Figure 4:
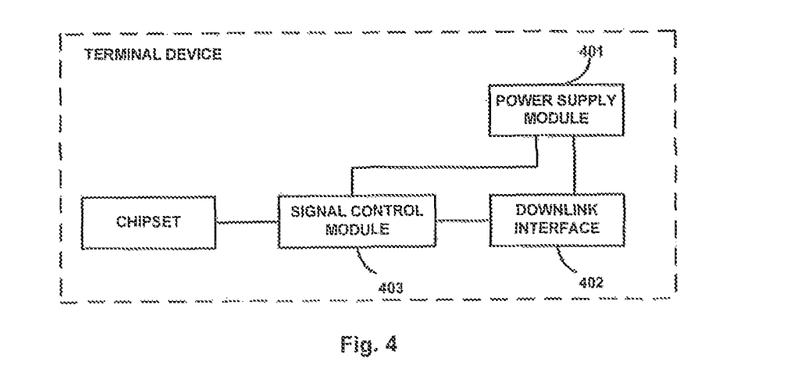
FIG. 4 is a schematic block diagram of a terminal device according to another embodiment of the present invention.

FIG. 4 is a schematic block diagram of a terminal device according to another embodiment of the present invention. In this embodiment, a terminal device is provided and may be a computer such as a notebook computer. As shown in FIG. 4, the terminal device may include a power supply module 401, a downlink interface 402 and a signal control module 403.

The power supply module 401 is configured to provide an external power supply to the downlink interface 402 and the signal control module 403. In an embodiment, the power supply module 401 may be an existing device for supplying power to the terminal device, such as a DC source converted by a supply adapter, or a battery affiliated to the terminal device. Such configuration requires addition of a path from the power supply module 401 to the downlink interface 402 and the signal control module 403, such that a power supply required for operations of the downlink interface 402 and the signal control module 403 may be constantly available. Further, the downlink interface 402 and the signal control module 403 can be provided with power via the added path even when the terminal device is in a power-off or sleep state. Accordingly, the signal control module 403 can perform a status switching operation, and the downlink interface 402 can provide a voltage for charging an electronic device to be charged.

In another embodiment, the power supply module 401 may not be an existing device for supplying power to the terminal device. Instead, the power supply module 401 may be a separate power supply device dedicated to supplying power to the downlink interface 402 and the signal control module 403. Meanwhile, an existing power supply device for supplying power to the terminal device may also be provided for supplying power to the terminal device. When the terminal device is powered on and not in a sleep state, with the presence of the existing power supply device, the chipset of the terminal device will supply power to the downlink interface 402. When the terminal device is powered off or in a sleep state, the chipset of the terminal device will no supply power to the downlink interface 402 even with the presence of the existing power supply device (e.g., it is connected to mains power via an adapter, or a battery is still installed). On the other hand, the power supply module 401 can supply power to the downlink interface 402 and the signal control module 403 regardless of the state of the terminal device. Alternatively, further control may be provided such that the power supply module 401 will be triggered to supply power to the downlink interface 402 and the signal control module 403 only when the terminal device is powered off or in a sleep state.

The downlink interface 402 is configured for connection to the electronic device to be charged. The electronic device may have an operating mode and a charging mode. The downlink interface 402 may be a USB interface, a FIREWIRE (1394) interface or the like.

As above described, when the terminal device is powered on and not in a sleep state, there are two supply voltages on the downlink interface 402, one from the chipset of the terminal device, and the other from the power supply module 401. At this time, the electronic device to be charged is in the operating mode, and can perform data transmission with the terminal device and can be charged with the power from the chipset when the power is insufficient. When the terminal device is powered off or in a sleep state, there is a supply voltage on the downlink interface 402 which is from the power supply module 401. At this time, the electronic device is in the charging mode, and thus cannot perform data transmission with the terminal device or be charged as in the conventional methods.

The signal control module 403 is arranged in the path for providing power supply from the chipset of the terminal device to the downlink interface 402. The signal control module 403 is configured to control a status of a signal line in the downlink interface based on a power supply status on the path. The electronic device to be charged enters one of the operating and charging modes based on the status of the signal line in the downlink interface, when the electronic device is connected to the downlink interface.

Here, the signal control module 403 is provided in the terminal device such that the electronic device can be charged even when the terminal device is powered off or in a sleep state. As above described, the signal control module 403 may obtain an external power supply from the power supply module 401, and thus always obtain a voltage required for its operation no matter what state the terminal device is in. In a specific example, the signal control module 403 may detect the power supply status on the path, and control the signal line status in the downlink interface 402 based on the power supply status.

For example, when the terminal device is powered on and not in a sleep state, the chipset of the terminal device provides power supply to the downlink interface 402. At this time, a supply voltage is present on the path between the chipset and the downlink interface 402. If the first electronic device is powered off or in a sleep state, there will be no supply voltage on the path. Accordingly, the signal control module 403 may control the signal line status in the downlink interface 402 based on the supply voltage status on the path. That is, if a supply voltage is detected on the path, it is determined that the terminal device is powered on and not in a sleep state. In this case, the status signal outputted on the signal line of the downlink interface 402 will be a normal signal indicative of the operating mode. The electronic device to be charged may enter the charging mode and thus be charged with the voltage from the chipset of the terminal device.

If the signal control module 403 detects that no supply voltage exists on the path, it will determine that the terminal device is powered off or in a sleep state. To indicate this status, another signal will be outputted from the signal line of the downlink interface 402. In an embodiment, the signal line status in the downlink interface may be set to a connection on status, and the electronic device to be charged may enter the charging mode in response to the connection on status. Accordingly, the downlink interface 402 may use the external power supply to charge the electronic device. That is, when the terminal device is powered off or in a sleep state, the downlink interface 402 still has a supply voltage thereon, and thus outputs a signal indicative of the signal line status. In response to the signal, the electronic device to be charged will enter the charging mode. In this case, the electronic device can be charged via the downlink interface, though no data transmission can be performed with the terminal device. At this time, only the external power supply from the power supply module 401 exists on the downlink interface 402. Accordingly, the downlink interface 402 uses this external power supply to charge the electronic device.

In another embodiment, there may be a plurality of downlink interfaces 402 in order to simultaneously connect to a plurality of electronic devices to be charged. An interface control module is further provided in the terminal device. The interface control module is arranged in the path for providing power from the chipset to the downlink interface, and configured to multiplex one downlink interface signal into a plurality of downlink interface signals, such that the plurality of electronic devices can be connected to the terminal device. In this case, there may be a plurality of signal control modules 403 each arranged between the interface control module and a respective one of the downlink interfaces 402.

The specific example of the signal control module 403 may be illustrated in FIG. 3. When the signal control module 403 detects a supply voltage present on the path between the chipset and the downlink interface 402, it determines that the terminal device is powered on and not in a sleep state, and thus outputs the status signal D+1, D−1 to the signal lines D+, D− in the downlink interface. If the signal control module 403 detects no supply voltage present on the path between the chipset and the downlink interface 402, it determines that the terminal device is powered off or in a sleep state, and thus outputs the status signal D+2, D−2 to the signal lines D+, D− in the downlink interface. This status signal indicates that the two signal lines in the downlink interface is in a connection on (short-circuit) status, and has been disconnected from the interface control module. In this way, the electronic device to be charged may obtain a status signal of the signal lines in the downlink interface and enter the charging mode in response to the signal, thereby enabling charging of the electronic device.

According to the embodiment of the present invention, the terminal device can be connected to the electronic device to be charged via the downlink interface, and there is a status signal output on the signal lines of the downlink interface even when the terminal device is powered off or in a sleep state. That is, with the terminal device of the present embodiment, the electronic device can be charged, even if the terminal device is powered off or in a sleep state, and the electronic device can be charged only when there is a status signal output on the signal lines of the downlink interface.

Figure 5:
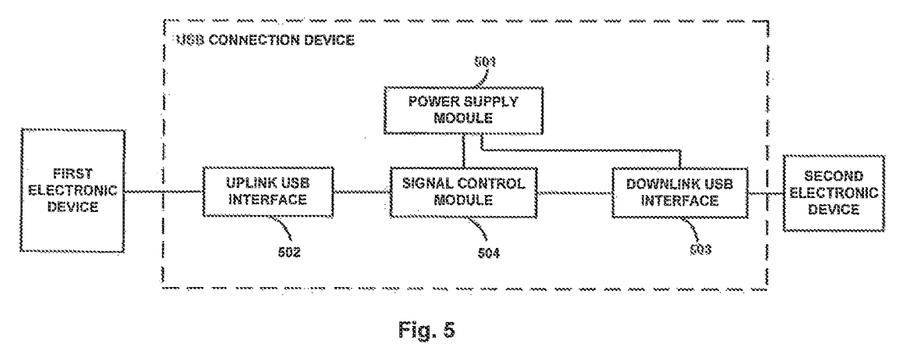
FIG. 5 is a schematic block diagram of a USB connection device according to an embodiment of the present invention.

FIG. 5 is a schematic block diagram of a USB connection device according to a further embodiment of the present invention. As shown in FIG. 5, the USB connection device may include a power supply module 501, an uplink USB interface 502, a downlink USB interface 503 and a signal control module 504.

The power supply module 501 is configured to provide an external power supply to the downlink USB interface 503 and the signal control module 504. The power supply module 501 is immune from the operation states of the first electronic device. For example, the power supply module 501 can provide the external power supply to the downlink USB interface 503 and the signal control module 504 even when the first electronic device is in a powered-off or sleep state.

The uplink USB interface 502 is configured to connect to the first electronic device. The first electronic device may be a computer-type terminal device, such as a notebook computer.

The downlink USB interface 503 is configured to connect to a second electronic device different from the first electronic device and having an operating mode and a charging mode. Herein, the USB connection device may be a device that connects the first electronic device (e.g., computer-type terminal device) with the second electronic device (e.g., a to-be-charged electronic device, such as a mobile phone) via a USB interface. This USB connection device typically has a USB interface at each of the two ends of the USB connection device, one for connecting to the computer-type terminal device and called uplink USB interface, and the other for connecting to the to-be-charged electronic device and called downlink USB interface.

There may be a plurality of downlink USB interfaces for connecting to multiple to-be-charged electronic devices. In this case, the USB connection device is often called USB hub. In the present embodiment, the USB hub is a self-powered USB hub since it has its own power supply module. A brief introduction of USB hub and self-powered USB hub will be given for a better understanding. The USB hub is a device that can convert a single USB interface into more than one USB interface and allow these USB interfaces to be used simultaneously. However, the USB device requires external power supply. A USB interface built on a mainboard of the terminal device usually is powered by the chipset, and the amount of supplied power is limited. Thus, a power shortage may occur if a plurality of such USB devices requiring external power supply are used at the same time. In view of this problem, the self-powered USB hub has been proposed. The self-powered USB hub has its own power source, and thus can supply power to a connected USB device with its own power source if the power supplied from the mainboard is insufficient.

The signal control module 504 is arranged between the uplink USB interface 502 and the downlink USB interface 503, and configured to control a status of a signal in the downlink USB interface 503 based on a status of a power supply of the uplink USB interface 502. The second electronic device enters one of the operating and charging modes based on the status of the signal in the downlink USB interface 503, when the second electronic device is coupled with the downlink USB interface 503.

In this embodiment, the signal control module 504 is provided in the USB connection device to enable charging of the second electronic device when the first electronic device is powered off or in a sleep state. The signal control module 504 may obtain an external power supply from the power supply module 501, such that the signal control module 504 can obtain a voltage required by its operation no matter which state the first electronic device enters. In an embodiment, the signal control module 504 may detect the power supply status of the uplink USB interface 502, and control the signal line status of the downlink interface 503 based on the detected power supply status.

For example, when the first electronic device is powered on and not in a sleep state, the chipset of the first electronic device provides a supply voltage to the uplink USB interface 502 of the USB connection device, and then the uplink USB interface 502 provides the supply voltage to the downlink USB interface 503. If the first electronic device is powered off or in a sleep state, there will be no supply voltage on the uplink USB interface 502. Accordingly, the signal line status in the downlink USB interface 503 may be controlled based on the supply voltage status on the uplink USB interface 502. That is, if the supply voltage is detected on the uplink USB interface 502, it is determined that the first electronic device is powered on and not in a sleep state. In this case, the status signal outputted from the signal line of the downlink USB interface 503 will be a normal signal indicative of the operating mode. The second electronic device may accordingly enter the charging mode and thus be charged with the voltage from the chipset of the first electronic device.

If the signal control module 504 detects that no supply voltage exists on the uplink USB interface 502, it will determine that the first electronic device is powered off or in a sleep state. To indicate this status, another signal will be outputted from the signal line of the downlink USB interface 503. In an embodiment, the signal line status in the downlink USB interface 503 may be set to a connection on status, and the second electronic device may enters the charging mode in response to the connection on status. Accordingly, the downlink USB interface 503 may use the external power supply to charge the second electronic device. That is, when the first electronic device is powered off or in a sleep state, the downlink USB interface 503 still has a supply voltage thereon, and thus outputs a signal indicative of the signal line status. In response to the signal, the second electronic device will enter the charging mode. In this case, the second electronic device can be charged via the downlink USB interface, though no data transmission can be performed with the first electronic device. At this time, only the external power supply from the power supply module 501 exists on the downlink USB interface 503. Accordingly, the downlink USB interface 503 uses this external power supply to charge the second electronic device If the USB connection device is the USB hub as above described, an interface control module needs to be provided in the USB connection device.

Figure 6:
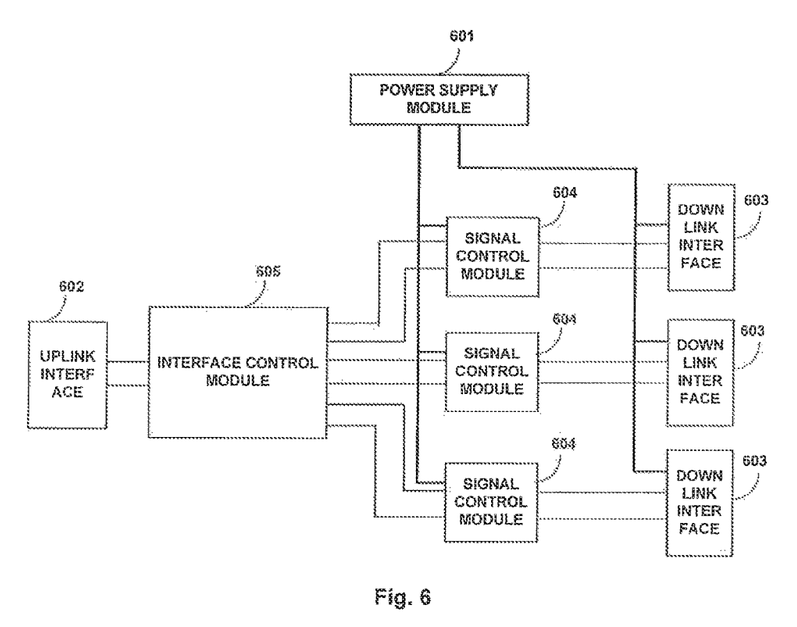
FIG. 6 is a schematic block diagram of another USB connection device according to an embodiment of the present invention.

FIG. 6 is a schematic block diagram of another USB connection device according to an embodiment of the present invention. As shown in FIG. 6, the interface control module 605 is arranged between the uplink USB interface 602 and the downlink USB interface 603, and configured to multiplex one downlink USB interface signal into a plurality of downlink USB interface signals, such that a plurality of second electronic devices can be connected to the first electronic device via a plurality of downlink USB interfaces 603. In this case, there may be a plurality of signal control modules 604 each arranged between the interface control module 605 and a respective one of the downlink USB interfaces 603. The power supply module 601 in FIG. 6 may be the same as the power supply module 501 in FIG. 5.

The signal control module may be used to switch the signal line status of the downlink USB interface, that is, switch the signal line in the downlink USB interface to different statuses with respect to different states of the first electronic device. In an embodiment, if there is no supply voltage on the uplink USB interface, and the signal line status of the downlink USB interface is set to a connection on status, the signal control module may be implemented as shown in FIG. 3, in which the signal line status of the downlink USB interface may be switched between D+1, D−1 and D+2, D−2 in two control stages. When the first electronic device is powered on and not in a sleep state, the status signal D+1, D−1 may be outputted to the signal lines D+, D− in the downlink USB interface. If it is detected that the first electronic device is powered off or in a sleep state, the status signal D+2, D−2 may be outputted to the signal lines D+, D− in the downlink USB interface. This status signal indicates that the two signal lines in the downlink USB interface is in a connection on (short-circuit) status, and has been disconnected from the interface control module. In this way, the second electronic device may obtain a status signal of the signal lines in the downlink USB interface and enter the charging mode in response to the signal.

With the USB connection device of the embodiment of the present invention, there is a status signal output on the signal lines of the downlink USB interface even when the first electronic device is powered off or in a sleep state. Accordingly, the second electronic device can be charged, even if the first electronic device is powered off or in a sleep state, and the second electronic device can be charged only when there is a status signal output on the signal lines of the downlink interface.

In a further embodiment of the present invention, a signal control apparatus is provided. As shown in FIG. 3, the signal control apparatus is supplied with power from an external power source, and configured to switch the signal line status in the downlink interface depending on the state of a computer-type terminal device. The downlink interface is used for connection to a to-be-charged electronic device, and can obtain power supplied from the external power source. More particularly, the signal control apparatus may detect the state of the terminal device. When it detects that the terminal device is in a power-on and non-sleep state, the signal control apparatus may set the signal line status in the downlink interface to a status indicating a normal connection to the chipset of the terminal device. When it detects that the terminal device is in a power-off or sleep state, the signal control apparatus may switch the signal line status in the downlink interface to a connection on (short-circuit) status. The to-be-charged electronic device, when connected to the downlink interface, may switch its modes based on the signal line status in the downlink interface. When the signal line status in the downlink interface indicates a normal connection to the chipset of the terminal device, the electronic device enters an operating mode. At the same time, the electronic device may also enter a charging mode, and may perform data transmission with the terminal device. When the signal line status in the downlink interface is the connection on status, the electronic device enters the charging mode in which it is charged.

The signal control apparatus may be specifically implemented as shown in FIG. 3, in which the signal line status of the downlink interface may be switched between D+1, D−1 and D+2, D−2 in two control stages. When the first electronic device is powered on and not in a sleep state, the status signal D+1, D−1 may be outputted to the signal lines D+, D− in the downlink interface. If it is detected that the first electronic device is powered off or in a sleep state, the status signal D+2, D−2 may be outputted to the signal lines D+, D− in the downlink interface. This status signal indicates that the two signal lines in the downlink interface is in a connection on (short-circuit) status, and has been disconnected from the interface control module. In this way, the to-be-charged electronic device may obtain a status signal of the signal lines in the downlink USB interface and enter the charging mode in response to the signal. Here, the connection on status of D+2 and D−2 may be pre-configured, and it is the signal control apparatus that decides when the signal may be outputted to the signal lines in the downlink interface.

Figure 7:
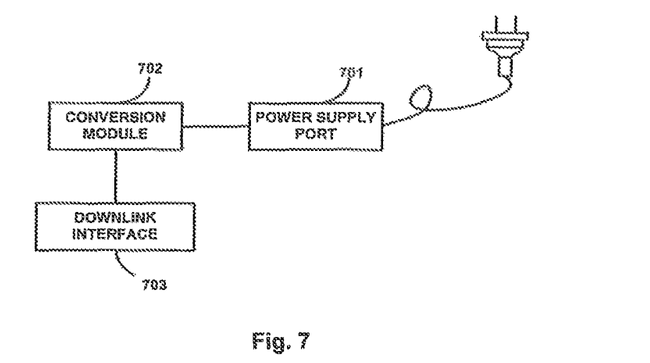
FIG. 7 is a schematic block diagram of a charging station according to an embodiment of the present invention.

A charging station is also provided according to a still further embodiment of the present invention. Such charging station may be installed in public places such as bus stations or airports, and charge various types of electronic devices via a uniform interface. FIG. 7 is a schematic block diagram of the charging station in the present embodiment. As shown in FIG. 7, the charging station includes a power supply port 701, a conversion module 702, and a downlink interface 703.

The power supply port 701 is configured to connect to a AC source. The power supply port 701 may be installed in a mains outlet to obtain an AC power supply.

The conversion module 702 is configured to convert an AC power from the AC source into a DC power. This conversion module 702 is similar to that in the adapter, and converts an AC power from the mains outlet to a DC power, since electronic devices typically require DC power for charging them.

The downlink interface 703 is coupled with the conversion module and configured to connect to an electronic device to be charged. The status of a signal line in the downlink interface includes a connection on status. The electronic device to be charged enters a charging mode based on the connection on status, when the electronic device is connected to the downlink interface. The downlink interface uses a supply voltage obtained from the conversion module to charge the electronic device.

The downlink interface 703 obtains power supply from the conversion module 702, and the to-be-charged electronic device is connected to the charging station via the downlink interface 703. In a specific example, the signal line status of the downlink interface 703 may be controlled by a signal control module, which may output a signal indicative of a connection on status to the signal line of the downlink interface 703. Alternatively, the signal line status of the downlink interface 703 may be pre-configured, such that the signal line of the downlink interface 703 may always output the signal indicative of the connection on status.

Figure 8:
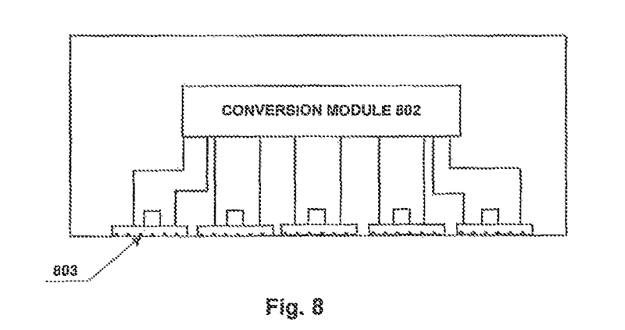
FIG. 8 is a schematic block diagram of another charging station according to an embodiment of the present invention.

FIG. 8 is a schematic block diagram of another charging station according to an embodiment of the present invention. As shown in FIG. 8, the charging station may have a plurality of downlink interfaces 803 so as to charge a plurality of to-be-charged electronic devices at the same time.

To be noted, the downlink interface 603 may be a USB interface, a FIREWIRE (1394) interface or any suitable interface. In the present embodiment, although no computer-type terminal device is involved, the charging station can output the status signal on the signal line of the downlink interface, so that the to-be-charged electronic device can enter the charging mode upon recognizing such status signal. The downlink interface can be a USB or 1394 interface, and this facilitates charging various electronic devices via a uniform interface.

The foregoing specifically describes adapters, terminal devices, USB connection devices and charging stations according to embodiments of the present invention. The ideas and implementations of the present invention have been illustrated with specific examples, which are intended for better understanding of the present invention. Those ordinarily skilled in the art will appreciate that changes can be made on the embodiments and applications without departing from the ideas of the present invention. The above description should not be construed as limiting the present invention.

What is claimed is:

1. A USB connection device comprising a power supply module, an uplink USB interface, a plurality of downlink USB interfaces and a signal control module, wherein the power supply module is configured to provide an external power supply to the downlink USB interfaces and the signal control module, the uplink USB interface is configured to connect to a first electronic device, the downlink USB interfaces are configured to connect to a plurality of second electronic devices different from the first electronic device and having an operating mode and a charging mode, the signal control module is arranged between the uplink USB interface and the downlink USB interfaces, and configured to control a status of a signal line in the downlink USB interfaces based on a status of a power supply of the uplink USB interface, each of the second electronic devices enters one of the operating and charging modes based on the status of the signal line in a respective downlink USB interface, when the second electronic device is coupled with the respective downlink USB interface; and wherein the signal control module is further configured to set the status of the signal line in each of the downlink USB interfaces to a connection on status when there is no supply voltage of the uplink USB interface, such that each second electronic device enters the charging mode based on the connection on status, and the downlink USB interfaces use a voltage from the power supply module to charge the second electronic devices so that the USB connection device is configured to be a self-powered USB hub.

2. The USB connection device of claim 1, wherein the USB connection device further comprises a USB interface control module arranged between the uplink USB interface and the downlink USB interfaces and configured to multiplex one downlink interface signal into a plurality of downlink interface signals, and the signal control module is arranged between the USB interface control module and the downlink USB interfaces.

* * * * *